US012613867B1

(12) United States Patent
Gassner et al.

(10) Patent No.: US 12,613,867 B1
(45) Date of Patent: Apr. 28, 2026

(54) SYSTEMS AND METHODS FOR DYNAMIC REAL-TIME QUERYING OF DISPARATE DATA PACKAGES TO PROACTIVELY GENERATE PERSONALIZED SEARCH RESULTS

(71) Applicant: Veeva Systems Inc., Pleasanton, CA (US)

(72) Inventors: Peter Gassner, Pleasanton, CA (US); Arno Sosna, Pleasanton, CA (US); Daniel J. Rizzo, Lloyd Harbor, NY (US); Robert Walter, St. Petersburg, FL (US); Brian Scates, Oakland, CA (US)

(73) Assignee: Veeva Systems Inc., Pleasanton, CA (US)

( * ) Notice: Subject to any disclaimer, the term of this patent is extended or adjusted under 35 U.S.C. 154(b) by 0 days.

(21) Appl. No.: 19/329,715

(22) Filed: Sep. 16, 2025

(51) Int. Cl.
*G06F 16/2453* (2019.01)
*G06F 16/248* (2019.01)

(52) U.S. Cl.
CPC ...... *G06F 16/24542* (2019.01); *G06F 16/248* (2019.01)

(58) Field of Classification Search
CPC ............. G06F 16/24542; G06F 16/248; G06F 16/2457; G06F 16/24575
See application file for complete search history.

(56) References Cited

U.S. PATENT DOCUMENTS

| | | | | |
|---|---|---|---|---|
| 7,159,011 | B1 * | 1/2007 | Knight | G06F 16/951 |
| | | | | 707/E17.108 |
| 8,938,414 | B1 * | 1/2015 | Kolesnikov | G06Q 10/10 |
| | | | | 707/703 |
| 9,830,391 | B1 * | 11/2017 | Bakir | G06F 16/248 |
| 11,556,526 | B1 * | 1/2023 | Starnes | G06F 16/252 |
| 2008/0147647 | A1 * | 6/2008 | Reeb | G06F 16/2423 |
| | | | | 707/999.005 |
| 2015/0046204 | A1 * | 2/2015 | Sitina | G06Q 10/063 |
| | | | | 705/7.11 |
| 2021/0248136 | A1 * | 8/2021 | Panuganty | G06F 16/972 |

* cited by examiner

*Primary Examiner* — Hares Jami
(74) *Attorney, Agent, or Firm* — Ansari Katiraei LLP; Arman Katiraei

(57) ABSTRACT

Disclosed is a search system and associated methods for proactively searching disparate data sources in order to track in real-time the continuously changing attributes that are searchable and to generate personalized search results for different users based on machine-generated queries of relevant searchable attributes to each user without user-defined queries or user-initiated searches. The search system continuously searches the data sources for changes to a first set of searchable attributes with relevance to a first user and to a second set of searchable attributes to a second user. The search system generates and performs a first customized query of the first set of attributes identified with the changes and a second customized query of the second set of attributes identified with the changes, and provides the personalized search results from each query to the respective user in response to detecting that respective user accessing the search system.

20 Claims, 6 Drawing Sheets

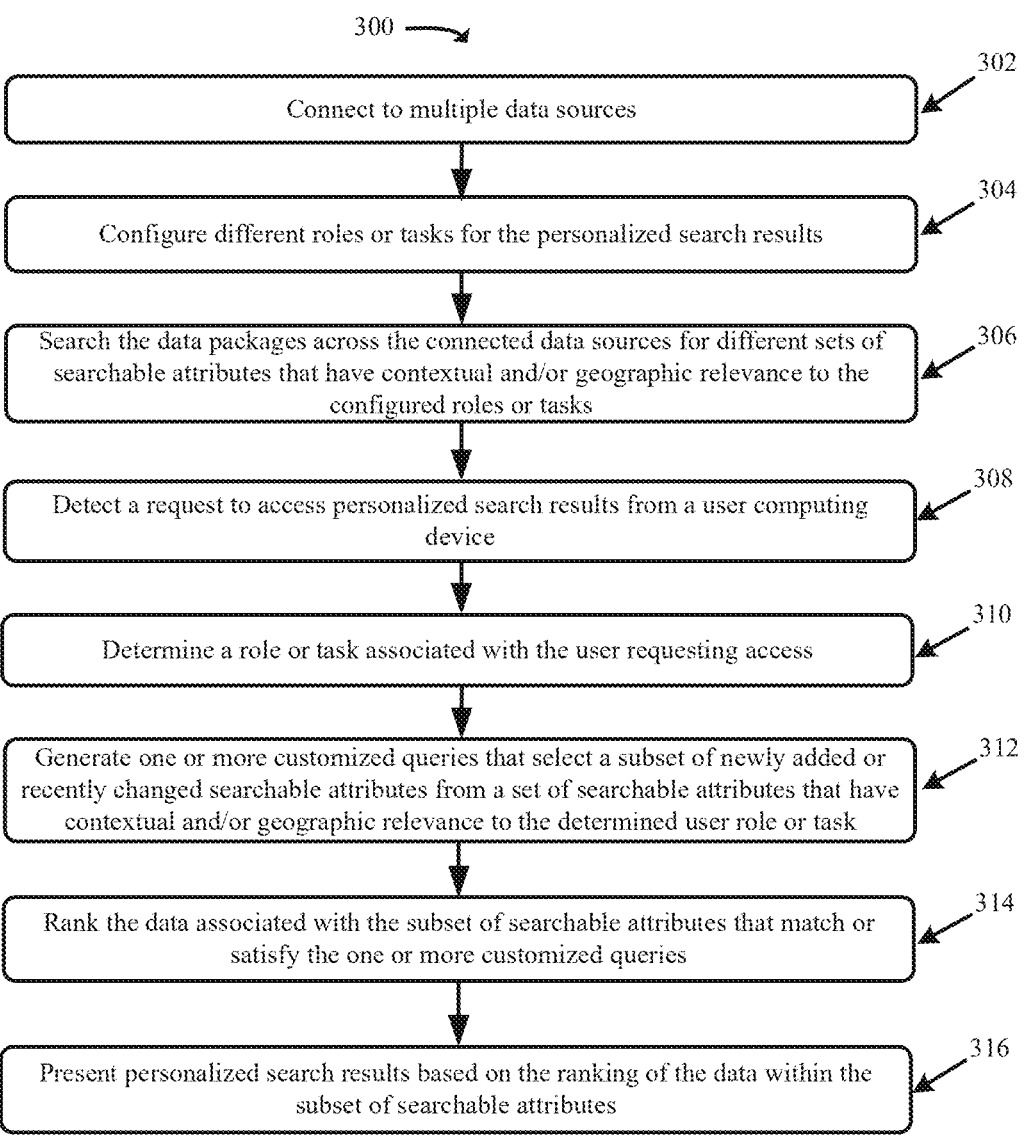

300

302
Connect to multiple data sources

304
Configure different roles or tasks for the personalized search results

306
Search the data packages across the connected data sources for different sets of searchable attributes that have contextual and/or geographic relevance to the configured roles or tasks 308
Detect a request to access personalized search results from a user computing device 310
Determine a role or task associated with the user requesting access 312
Generate one or more customized queries that select a subset of newly added or recently changed searchable attributes from a set of searchable attributes that have contextual and/or geographic relevance to the determined user role or task 314
Rank the data associated with the subset of searchable attributes that match or satisfy the one or more customized queries 316
Present personalized search results based on the ranking of the data within the subset of searchable attributes

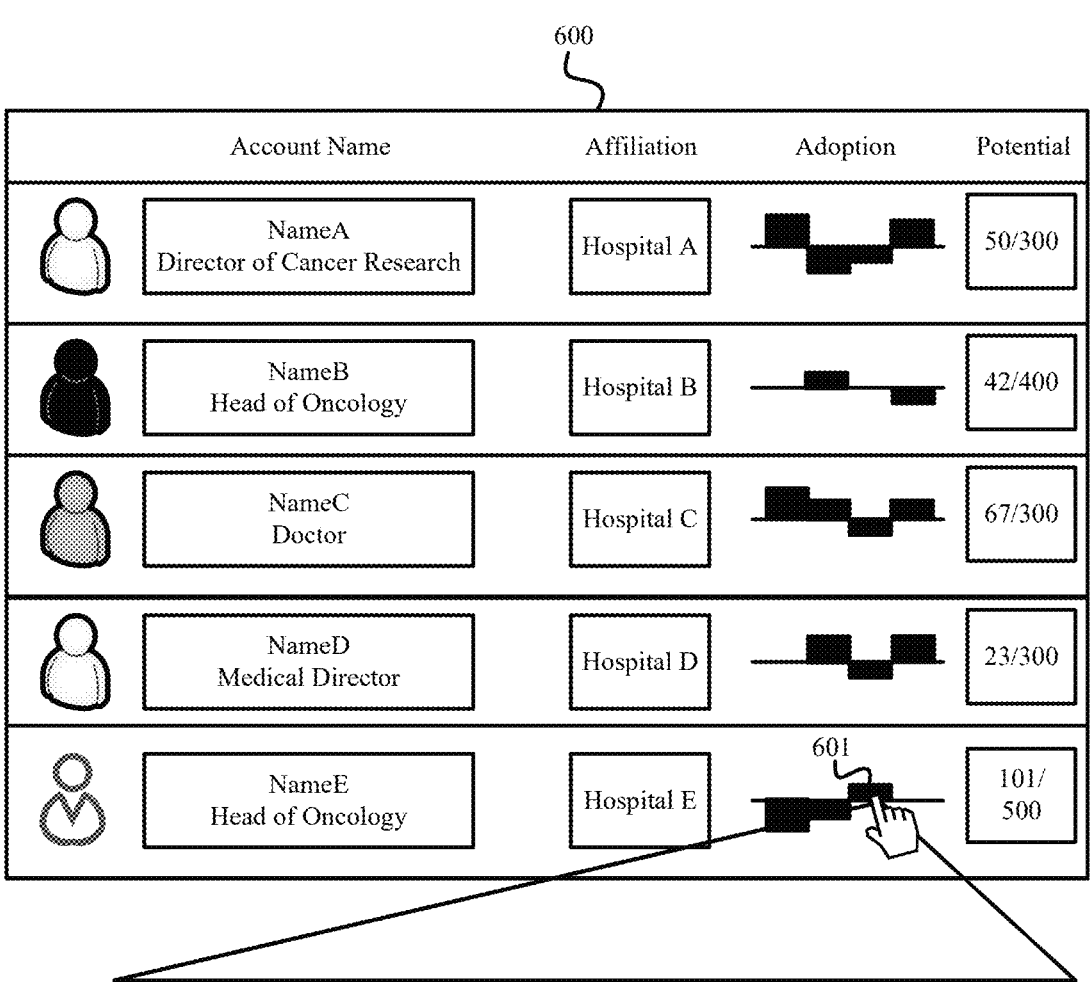

| | Account Name | Affiliation | Adoption | Potential |
|---|---|---|---|---|
| | NameA<br>Director of Cancer Research | Hospital A | | 50/300 |
| | NameB<br>Head of Oncology | Hospital B | | 42/400 |
| | NameC<br>Doctor | Hospital C | | 67/300 |
| | NameD<br>Medical Director | Hospital D | | 23/300 |
| | NameE<br>Head of Oncology | Hospital E | 601 | 101/500 |

In the last 30 days, NameE has started 2 new patients on DrugA and has started 5 on the competitor's DrugB.

It has been over 6 months since a team meet with NameE to describe the effectiveness and limited side effects of DrugA. New StudyX has been published since detailing improved effectiveness and fewer side effects.

NameE opened an email 2 days ago and clicked on additional information tied to titration schedules for DrugA.

NameE has not prescribed DrugA for approved indication B in the past month.

Engagement summary over 3 months:
In-person v. electronic communication

FIG. 6

SYSTEMS AND METHODS FOR DYNAMIC REAL-TIME QUERYING OF DISPARATE DATA PACKAGES TO PROACTIVELY GENERATE PERSONALIZED SEARCH RESULTS

TECHNICAL FIELD

The present disclosure relates to the fields of search and search optimization, and particularly search and search optimization systems using artificial intelligence.

BACKGROUND

Data and/or computer searches have been and mostly remain as reactive or user-initiated operations. There is a need to shift the paradigm to proactive searches that alleviate users from generating query after query to try and surface desired data or search results from large datasets with millions of records stored in attributes that are unknown to the users.

BRIEF DESCRIPTION OF THE DRAWINGS

FIG. 3 presents a method for the proactive generation of personalized search results based on a dynamic real-time querying that is performed on behalf of different users in accordance with some example embodiments presented herein.

FIG. 6 illustrates example user interface that presents the machine-generated personalized search results with associated context in accordance with some example embodiments presented herein.

DETAILED DESCRIPTION OF PREFERRED EMBODIMENTS

Figure 1:
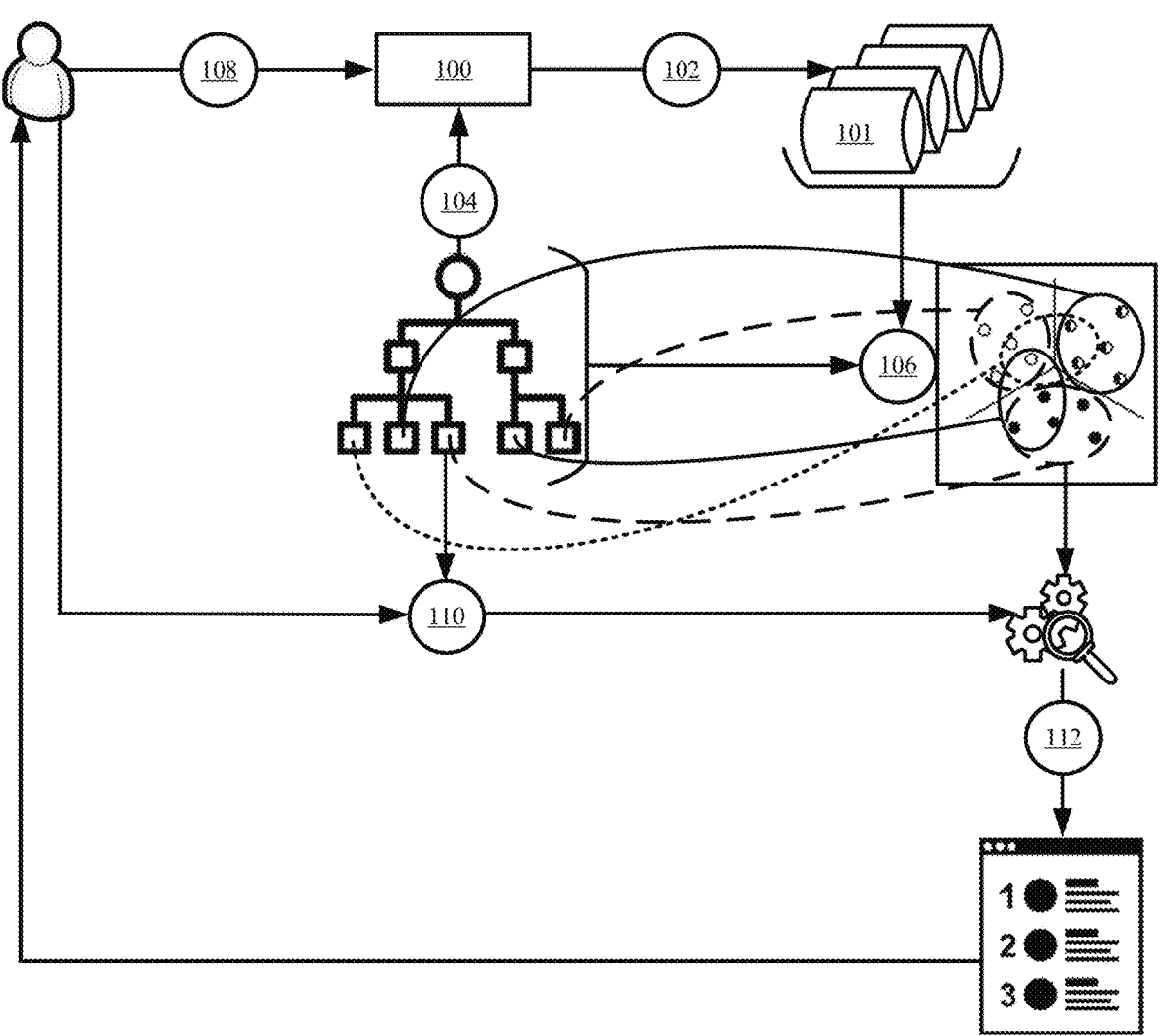
FIG. 1 illustrates an example of the dynamic real-time querying in accordance with some example embodiments presented herein.

This disclosure arises from the realization that reactive or user-initiated searches may produce incomplete, incorrect, or ineffective search results in certain scenarios and/or usage models. A reactive or user-initiated search occurs in response to a user-defined query. For instance, a user asks a search engine or an artificial intelligence (AI) chatbot a question or requests information via a query. The search engine or AI chatbot provides a response that best matches the queried attributes.

For a user-initiated search to be effective and retrieve the results intended by the user, the user defines the query with a proper structure and correct attributes that link to the intended results. The search engine or AI chatbot may produce an incomplete or incorrect response if the query is structured incorrectly or is missing critical attributes. The problem with retrieving intended or relevant results is exacerbated when the data being queried is constantly changing and/or being updated with new or different attributes that the user is unaware of. For instance, a user with a specific role in a large organization may be unaware of the different data records and/or attributes that are searchable due to some of the data records and/or attributes being created by other users with other roles and/or by third-parties that operate independent of the large organization. The problem is further exacerbated when the results the user seeks are based on complex relationships between multiple attributes that are stored in disparate data packages across multiple data sources.

Accordingly, the effectiveness of the user-initiated search may be limited to the searchable attributes that the user is familiar with. The effectiveness decreases when the searchable attributes are continuously changing and/or the user has limited view of the searchable attributes within a large or distributed dataset that has millions of data records. The effectiveness further decreases when the desired data involves complex relationships between multiple searchable attributes and is accessed when those complex relationships are presented in the user query or search. Consequently, when a user is unaware of the full breadth of searchable attributes, newly updated or available attributes, or complex relationships between multiple attributes, the user may generate query after query without ever revealing the correct or desired data. The inability to easily and efficiently search for desired data within a large continuously changing dataset that may be distributed across disparate data sources reduces the productivity and effectiveness of sales representatives, customer support personnel, and/or other personnel in siloed roles.

The current disclosure provides a technical solution for a technological problem in the fields of search and search optimization using artificial intelligence. The technical solution replaces existing reactive or user-initiated search with proactive search. The proactive searching generates personalized search results for different users without user queries, prompts, or other user input. The proactive searching and personalized search results are comprehensive and encompass data from relevant searchable attributes in a distributed dataset that are subject to frequent updating or replacement.

The technical solution involves connecting a search system to disparate data sources that store continuously updated data packages with changing searchable attributes. The search system tracks changes to different sets of searchable attributes that have contextual and/or geographic relevance to different tracked roles or tasks. In response to a particular user accessing the search system, the search system determines the role or task performed by the particular user and selects a subset of searchable attributes that have recently changed or been updated from a set of searchable attributes that have contextual and/or geographical relevance to the particular user's role or task. The search system performs a customized complex querying of the selected subset of searchable attributes in real-time without input from the particular user. The customized complex querying generates personalized search results with data from recently changed or updated searchable attributes that the particular user may be unaware of, data based on complex relationships in the subset of searchable attributes that search system analyzes and surfaces in real-time, and/or other data within the subset of searchable attributes that are contextually and/or geographically relevant to the particular user's role or task without the particular user initiating the search or providing any search queries or parameters. The search system may present the search results produced by the customized complex querying in an interface in response to the particular user accessing the search system.

Accordingly, the technical solution involves proactively searching for the contextually and/or geographically relevant data from new or recently changed searchable attributes within the data packages of the disparate data sources so that the different users receive relevant personalized search results without initiating the search and without defining complex search queries that require a correct structure and a complete listing of searchable attributes in order to expose the desired data. The technical solution optimizes searching of disparate data source storing numerous data packages with continuously changing search attributes to alleviate users from having to be aware of the full breadth of searchable attributes, newly updated or available attributes, or complex relationships between multiple attributes.

FIG. 1 illustrates an example of the dynamic real-time querying in accordance with some example embodiments presented herein. Search system 100 connects (at step 102) to multiple data sources 101. Each data source 101 stores different data packages that may be regularly or periodically updated by different teams or systems. For instance, a first data source may correspond to a Customer Relationship Management (CRM) system, a second data source may correspond to a vendor's repository, and third data source may correspond to a customer's repository. Each data package stores data with various searchable attributes. In some example embodiments, a data package is a structured data file with key-value pairs or tags that store a searchable attribute and values that represent the value of the searchable attribute.

Search system 100 may establish a persistent connection to data sources 101. Using the persistent connection, search system 100 may monitor or track updates to the stored data packages if data sources 101 in real-time. For instance, search system 100 may track which data packages change over a period of time and which data packages contain new searchable attributes that were not previously defined in other data packages.

In some example embodiments, search system 100 periodically scans the data packages for changes or updates. In some such embodiments, the data packages may be time-stamped or arranged based on when the data packages were uploaded, updated, or changed.

Search system 100 receives (at step 104) different roles or tasks for which to perform the dynamic real-time querying. In some example embodiments, search system 100 receives (at step 104) the roles or tasks from a planning, CRM, human resources, or other system that defines goals or objectives for different agents assigned to perform the different tasks or roles. For example, the roles or tasks may include different products or services and territories that are assigned to different sales representatives. As another example, the roles or tasks may include different products or services that different customer support agents are responsible for. In this example, a first customer support agent may provide support for a first set of software services to customers in a first set of regions and a second customer support agent may provide support for a second set of physical products to customers in a second set of regions.

Search system 100 selects (at step 106) different sets of searchable attributes from the full breadth of searchable attributes detected in the data packages across data sources 101 that have relevance or significance to different roles or tasks. The selection (at step 106) is based on contextual relevance, geographic relevance, or another nexus between the searchable attributes and the role or task. Search system 100 establishes the nexus based on the source of the data in the data package or that is associated with the searchable attributes, the target or subject associated with the data or searchable attributes, the data values, defined or modeled relationships between the searchable attributes and the different roles or tasks, and/or other associations between the searchable attributes, data, and/or roles or tasks. For a customer support role that supports a set of products or services, search system 100 analyzes the data packages to detect and select (at step 106) the set of searchable attributes that are linked or specified in a data package for any product or service in the set of products or services. For a sales agent role in a given territory for a given product, search system 100 analyzes the data packages to detect and select (at step 106) the set of searchable attributes for potential customers of the product in the given territory, information or updates about the product, and/or activity involving the product, the potential customers, or the territory. The searchable attributes relevant to the customer support role may include lists of products or services that are supported by that role, features and/or known problems associated with the products or services, solutions for the known problems, instruction manuals associated with the products or services, and/or schematics or repair guides for the products or services, whereas the searchable attributes relevant to the sales agent role may include lists of products or services sold by the sales agent, pricing information, studies about the effectiveness of the products or services, competitor products or services, customer usage history, customer size, and/or customer sentiment towards the products or services.

In some example embodiments, search system 100 uses a large language model (LLM) or other AI to identify the nexus between different searchable attributes and a role or task. For instance, the LLM or other AI may detect changes or updates to data packages that are made in response to actions by agents associated with a given role or task. For instance, an agent associated with a given role or task may send an email to a potential customer. Search system 100, via the LLM or other AI, may analyze the email to identify specific terms or phrases that map to searchable attributes within one or more data packages in one or more data sources.

Search system 100 receives (at step 108) a request from a user that is associated with a particular role or task to access search system 100 and/or real-time personalized search results from search system 100. For instance, the user may perform a login procedure to access search system 100, may open an application that accesses search system 100, may navigate to a Uniform Resource Locator (URL), site, or other identifier for accessing search system 100, or may otherwise issue a call to access search system 100.

In some example embodiments, search system 100 is an Application Programming Interface (API) that the user or an application on the user device calls in order to retrieve the real-time personalized search results. Calls may be issued to the API in order to generate real-time personalized search results for different users or different user roles. For instance, a manager may generate a first API call that includes a first name or a first role of a first agent under the manager's purview and a second API call that includes a second name or a second role of a second agent under the manager's purview. The API calls cause search system 100 to generate different real-time personalized search results for each identified agent that the manager may review and/or edit.

Search system 100 searches (at step 110) data sources 101 using customized queries that specifically target the selected set of searchable attributes for the user and/or the particular role or task associated with the user. Search system 100 automatically generates the customized queries on behalf of the user without user input. Moreover, search system 100 generates the queries that drive the search in real-time in response to receiving (at step 108) the access request that identifies the user and/or the particular role or task. In particular, search system 100 defines the customized queries based on the most recent set of searchable attributes within the thousands or millions of data packages stored across data source 101 that are relevant or related to the user and/or the particular role or task associated with the user without the user specifying a single search term, parameter, or query.

In some example embodiments, search system 100 may use generative AI to define the one or more queries. The one or more queries search the selected set of searchable attributes for data from a subset of the set of searchable attributes that have recently changed or been updated and affect the particular role or task associated with the user. In particular, the real-time querying includes searching the selected set of searchable attributes that have contextual and/or geographic relevance to the particular role or task of the user for a subset of searchable attributes that provide new information or temporally relevant information as a result of having recently been entered or changed in the data packages across data sources 101. Search system 100 automatically surfaces the data from the subset of searchable attributes that the user may have no knowledge of because they are newly entered in data sources 101 or because they have recently changed due to updates entered by third parties to the data packages storing the changed searchable attributes.

The real-time querying may include analyzing the data from the subset of searchable attributes in order to rank or prioritize the data prior to generating the personalized search results. The data analysis may include identifying relationships or patterns amongst the data and/or establishing a causal or temporal chain of searchable attribute changes. For instance, search system 100 may identify different searchable attributes that are updated contemporaneously or simultaneously in response to a common triggering event or action taken by another. Search system 100 may rank the data associated with those searchable attributes based on the source of the common triggering event or action or based on the scope of the change (e.g., number of searchable attributes affected by the common triggering event or action). Moreover, search system 100 may rank the searchable attributes based on their impact or effect on the particular role or task. Similarly, search system 100 may identify different searchable attributes that are updated in a sequential and linked manner in response to a common triggering event or action, and may rank the data based on source, scope, or impact of the common triggering event or action.

Search system 100 proactively generates and presents (at step 112) personalized search results to the user in a user interface without the user initiating the search or defining any of the queries that produced the search results. The personalized search results increase or improve the effectiveness of the user in performing their particular task or role by providing them new or updated data that assists the user in performing their particular task or role more efficiently or effectively without the user having to be aware of the searchable attributes that store the new or updated data and without the user having to manually generate query after query in attempts to isolate the new or updated data within the disparate data packages distributed across data sources 101.

Figure 2:
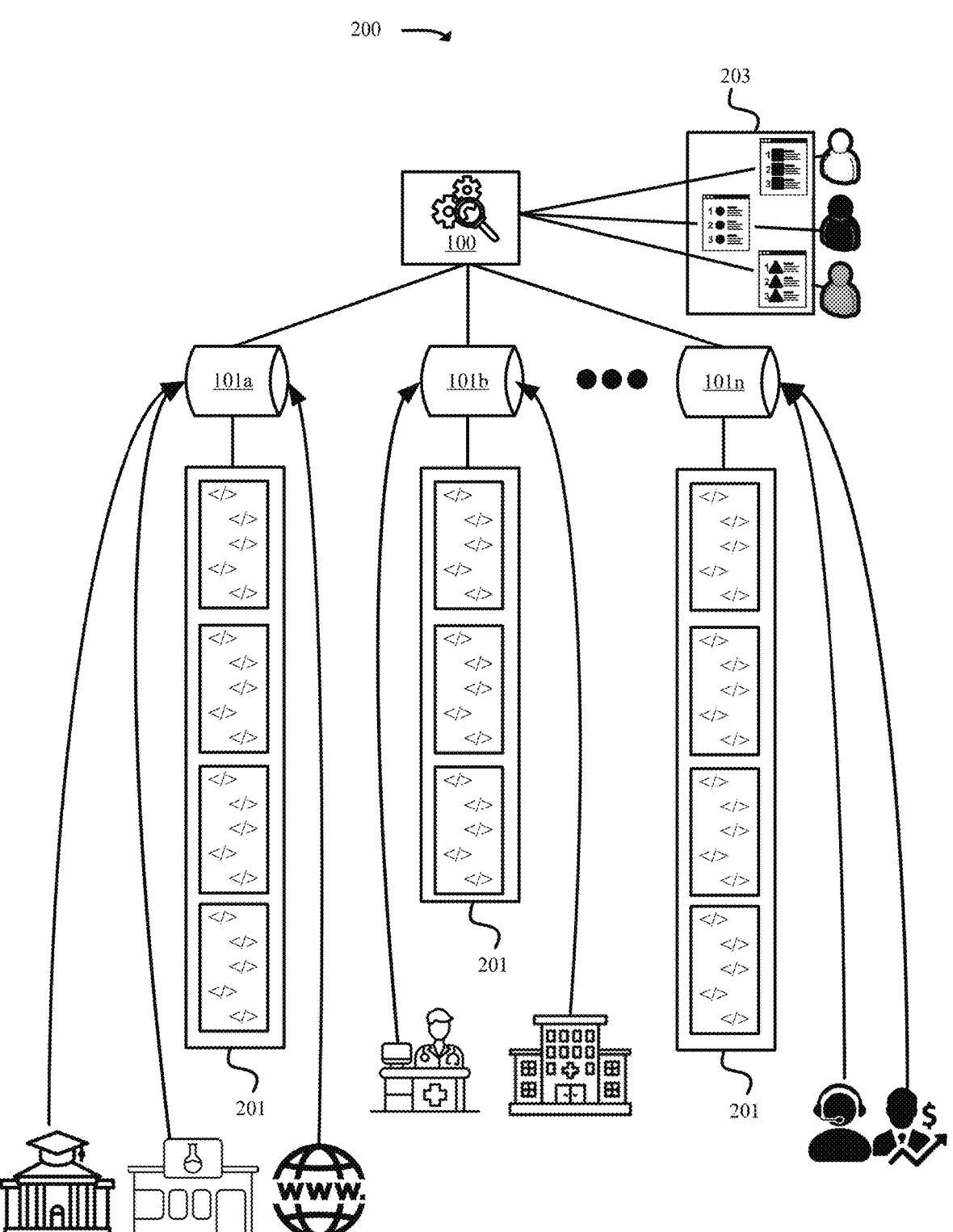
FIG. 2 illustrates an example architecture for performing the real-time querying and generating the personalized search results in accordance with some example embodiments presented herein.

FIG. 2 illustrates an example architecture 200 for performing the real-time querying and generating the personalized search results in accordance with some example embodiments presented herein. Example architecture 200 includes search system 100, data sources 101*a*, 101*b*, and 101*n* (hereinafter collectively referred to as "data sources 101" or individually as "data source 101"), and data packages 201 stored across data sources 101.

Data sources 101 may be stored or hosted on different cloud storage nodes or repositories of a cloud object storage service such as Amazon S3®. Data sources 101 correspond to different data repositories that may be operated or managed by one or more entities. For instance, data source 101*a* may correspond to a CRM system of a first entity, data source 101*b* may correspond to a vendor platform, and data source 101*n* may correspond to different customer purchasing or sales tracking systems. In any case, each data source 101 is operated to store different data with potential relevance to roles or tasks performed by agents of an organization. In some example embodiments, data sources 101 represent different data silos of the organization. For instance, data source 101*a* may store research and development data, data source 101*b* may store sales data, and data source 101*n* may store data safety and testing data.

The data stored by data sources 101 are organized in data packages 201. Data packages 201 may be created and uploaded to data sources 101 by various entities, data generators, or data collectors. In some example embodiments, data packages 201 are automatically generated by pulling data (e.g., daily sales data, newly uploaded research documents, etc.) from different computer systems or data stores. In some example embodiments, data packages 201 are manually generated by human agents that perform various data generation or data collection roles or tasks.

Data packages 201 may be defined according to a JavaScript Object Notation (JSON), Extensible Markup Language (XML), Parquet, or other structured file or data format. For instance, each data package 201 may be defined with one or more key-value pairs. The key of the key-value pair may be a tag or other identifier for a searchable attribute and the value of the key-value pair may represent the data for the identified searchable attribute.

Different teams or roles may use or define different searchable attributes to classify the relevant data for those teams or roles. A first team (e.g., customer support) may track or generate a first set of data that is parsed and stored with a first set of searchable attributes that the first team uses to identify their relevant data, and a second team (e.g., sales) may track or generate a different second set of data that is parsed and stored with a second set of searchable attributes that the second team uses to identify their relevant data. For instance, searchable attributes for data relevant to the first team may include <drug interactions>, <side effects>, and <dosage>, and searchable attributes for data relevant to the second team may include <indications/uses>, <pricing>, <insurance coverage>, and <studies>. The searchable attributes used by the different teams or roles may be fixed or may be custom-defined such that the list of searchable attributes may be ever expanding. For instance, a new medication may require a user to take specific tests before the new medication may be administered. The tests may be specified in a new searchable attribute <prerequisites> that was not needed for other medications sold by the company.

Data packages 201 may be specifically arranged or stored across data sources 101 to facilitate the real-time querying and/or detection of the contextual and/or geographic relevant searchable attributes by search system 100. In some example embodiments, data sources 101 use a hierarchical folder structure to temporally arrange data packages 201. In some such example embodiments, folders or directories are created to store data packages 201 that span different dates. For instance, a different folder may be created to store data packages 201 created or updated in a given week. The folders or directory may be nested or arranged to position the folder containing the most recently generated or updated data packages 201 at the top of the hierarchy or directory structure.

In some example embodiments, data sources 101 may receive unstructured data and may convert the unstructured data into the structured format of a data package 201. For instance, the unstructured data may be contained in a file or document that is submitted for storage in a data source 101. Data sources 101 may use an LLM or other AI to parse the data from the file or documents, classify the data with a tag or identifier from a dictionary of recognized tags or identifiers for the searchable attribute that is represented by the data, and define the structured format for the parsed data. The data classification may be based on the data format (e.g., date, number, sentence, etc.), surrounding context, classification of the file or document from which the data is parsed, the data source, and/or metadata that is associated with the data or the file or document.

In some other example embodiments, data packages 201 may contain unstructured data. In some such example embodiments, data packages 201 may correspond to tables or records within a database, files or documents with searchable data (e.g., text or values), and/or other formatted data.

Search system 100 includes one or more devices or machines with processor, memory, storage, network, and/or other hardware resources that are configured to perform the real-time querying and to generate the personalized search results for multiple users from the different data packages that are stored across data sources 101. The one or more devices or machines may correspond to a network-accessible server or computing system that operates as a proactive search engine. The proactive search engine may run in conjunction with a traditional reactive or user-initiated search engine. For instance, search system 100 may generate the personalized search results from the proactive searching of the contextually, geographically, and temporally relevant searchable attributes selected by search system 100 and may present a user interface with which the user may enter their own user-defined queries to search within the personalized search results or generate other search results.

Search system 100 may be implemented with a watcher service, a transformation engine, a storage layer, a query engine, and/or other components that execute in parallel to support simultaneous monitoring of data sources 101 and generation of personalized search results for numerous users accessing search system 100 at the same time. Search system 100 communicably couples to each data source 101 using a network connection. Search system 100 continuously monitors data sources 101 to track new and updated searchable attributes in the stored data packages 201. As data sources 101 may store thousands or more data packages 201 with each data package 201 storing hundreds or more searchable attributes, search system 100 may provide a real-time monitoring and tracking of millions of searchable attributes that is not possible via manual human monitoring and tracking of data packages 201 across data sources 101.

The watcher service of search system 100 that monitors for new files or data packages 201 across data sources 101 or in structured paths of data sources 101. In response to detecting a new file or data package 201, the watcher service may trigger an ingestion job that is performed by the transformation engine.

The transformation engine of search system 101 reads new files or data packages 201 (e.g., XML files, JSON files, Parquet files, etc.) detected by the watcher services, and performs a distributed large-scale data transformation, processing, and/or analytics of the new files or data packages 201. In some example embodiments, the transformation engine executes one or more Apache Spark jobs for the data transformation, processing, and/or analytics. The data transformation may include applying partitioning, upsert support, schema evolution, and/or versioning to the new files or data packages 201. The transformed data from the new files or data packages 201 may be written into a high-performance table format (e.g., Apache Iceberg) on the storage layer of search system 100.

The high-performance table format may store the transformed data in a columnar format that supports various database transactions for guaranteeing data integrity and reliability in the event of errors or concurrent access through atomicity, consistency, isolation, durability (ACID), and/or other properties. The tables storing the transformed data may be stored on the same or different cloud object storage service that stores data packages 201.

The query engine (e.g., StarRocks) of search system 100 may be configured to directly query the tables on the storage layer that store the transformed data. The query engine supports high-performance analytical querying (e.g., Online Analytical Processing (OLAP)) of the tables, and generates the personalized search results for different users based on the transformed data within the tables. The high-performance analytical querying supports a parallel generation of personalized search results for different users such that a single implementation or instance of search system 100 may service hundreds or thousands of simultaneous users. Search system 100 generates different custom interfaces 203 to present the personalized search results to the different users.

Architecture 200 provides a technical solution to the technical problem of searching continuously changing attributes within a large or distributed dataset. In particular, search system 100 by execution of the ingestion layer, transformation engine, storage layer, and query engines shifts from using a data warehouse implementation of the proactive searching to a datalake implementation. The datalake implementation stores the transformed data from data packages 201 in their raw native format and accommodates structured and semi-structured data from various sources without requiring upfront transformation. Unlike a data warehouse, which requires data to be cleansed and structured before storage (schema-on-write), a datalake uses a schema-on-read approach that applies structure when the data is needed for analysis or processing. Moreover, the high-performance table format used to store the transformed data increases computational efficiency and addresses limitations of traditional file formats by allowing the continuous evolution of a table's data schema or partition schema without reprocessing the existing data, as well as supporting atomic transactions ensuring data consistency and isolation for concurrent operations FIG. 3 presents a method 300 for the proactive generation of personalized search results based on a dynamic real-time querying that is performed on behalf of different users in accordance with some example embodiments presented herein. Method 300 is implemented by search system 100.

Method 300 includes connecting (at step 302) search system 100 to multiple data sources. The data sources may be selected based on the relevance of the stored data to roles or tasks performed by agents of an organization. The data sources may include data sources controlled by the organization, data sources controlled by third-party partners or affiliates of the organization, and/or data sources that are publicly accessible. The data sources may be data repositories that the organization uses to conduct business operations and/or that store data from different teams, groups, or departments of the organization. Connecting (at step 302) to the multiple data sources may include configuring search system 100 with privileges to access each of the data sources.

Method 300 includes configuring (at step 304) different roles or tasks for the personalized search results. Search system 100 may ingest the roles or tasks from an employee directory, organizational structure, job titles, or plans, goals, or objectives that are defined for different agents of the organization. For instance, tasks may be derived from daily, weekly, monthly, or quarterly goals or objectives that different organizational teams are to complete and/or a plan for different milestones or actions that the organizational teams are to perform in order to complete the goals or objectives. In some example embodiments, the roles or tasks may be qualified with certain products or services of the organization or certain geographic boundaries (e.g., designated territories). For instance, a sales role or a customer support role may be associated with certain products or services in a certain region. More specifically, a pharmaceutical sales role may task a sales agent with promoting the sale of approved medications for certain kinds of cancers to medical offices and medical practitioners (e.g., oncologists) that specifically treat those certain kinds of cancers.

Method 300 includes searching (at step 306) the data packages across the connected (at step 302) data sources for different sets of searchable attributes that have contextual and/or geographic relevance to the configured (at step 304) roles or tasks. In some example embodiments, the contextual relevance of a data package is determined based on the source that uploads that data packages and, more specifically, the source having the same or a related role or task as that of the differentiated set of searchable attributes. For instance, different members of the same team may upload different data packages to the data sources with each data package potentially containing different searchable attributes than other data packages. In some example embodiments, the contextual relevance of a data package is determined based on the product or service to which the data within the data package relates and different roles or tasks that involve or are associated with that product or service. In some example embodiments, the contextual relevance is determined based on identifiable or modeled relationships between the searchable attributes and the roles or tasks. For instance, a sales role frequently involves pricing, product information, lead generation, demonstration or presentation information, communications and contacts of a particular form, structure, or type, and/or other such data.

In some such example embodiments, search system 100 may model the relationships by determining different actions that are performed in furtherance of a role or task and determining data packages or data within the data packages that are generated or updated in response to one or more of the different actions being performed. The geographic relevance may be determined by aligning the location associated with a source uploading a data package or the data within a data package with geographic qualifiers associated with different roles or tasks. For instance, a sales agent may be assigned a particular territory that spans various zip codes, cities, or states and data that is generated or involves a customer within the particular territory has geographic relevance. Geographic relevance may also be established based on across different regions with similar demographics or metrics.

There may be millions of searchable attributes in the data packages stored across the connected (at step 302) data sources with the data packages and/or searchable attributes in the data packages being continually updated, replaced, or expanded. Accordingly, search system 100 continuously searches (at step 306) the data packages to maintain a real-time or up-to-date list of the searchable attributes with contextual and/or geographic relevance to the different roles or tasks. The continuous searching (at step 306) by the search system 100 offloads users from the burden of having to manually track and update the millions of searchable attributes in order to generate relevant queries for data that may otherwise remain hidden because the users are unaware of the changing searchable attributes or cannot manually track the changing searchable attributes.

In some example embodiments, search system 100 searches (at step 306) the data packages to track when the data packages are added to a data source and/or when one or more searchable attributes of a data package is changed. In some such example embodiments, the contextual and/or geographic relevance of a data package or searchable attribute within a data package to a task or role may be determined at a later time or on an on-demand basis.

Method 300 includes detecting (at step 308) a request to access personalized search results from a user computing device. The user computing device may issue the request in response to a user of the user computing device opening an application, navigating to a website, issuing an API call, performing an account login, or otherwise invoking a service for accessing the personalized search results that are proactively generated by search system 100.

Method 300 includes determining (at step 310) a role or task associated with the user that is logged in or operating the computing device. In some example embodiments, search system 100 may determine (at step 310) the user's role or task by receiving user identifying information with the access request and/or information in a user profile that is accessed as part of the request. For instance, the user may log into a planning system that lists various tasks or actions that the user has performed and still needs to perform. Search system 100 obtains the list of various tasks or actions, and determines the user role or task from the list of various tasks or actions. In some other example embodiments, search system 100 receives a user identifier (e.g., name, email address, telephone number, access credentials, username, identification number, etc.) with the request and performs a lookup of the identifier in order to determine (at step 310) the user's role or task.

Method 300 includes generating (at step 312) one or more customized queries that select a subset of newly added or recently changed searchable attributes from a set of searchable attributes that have contextual and/or geographic relevance to the determined (at step 310) user role or task. For instance, the set of searchable attributes may be defined in 100 data packages and the one or more customized queries may identify 20 searchable attributes in 10 of the 100 data packages that have been created, added, or changed over a specified period of time. In some example embodiments, search system 100 produces weekly reports such that the one or more queries are directed to selecting the data from the subset of searchable attributes that are new or have changed in the past week.

Generating (at step 312) the one or more customized queries may include requesting the data from a real-time updated list of searchable attributes that are associated with or have contextual relevance to the user's role or task. The real-time updated list of searchable attributes with contextual relevance is continually updated based on the searching (at step 306) performed by search system 100 prior to the user access request. In particular, the searches (at step 306) detect new or modified data packages and search system 100 determines which roles or tasks are affected or impacted by the searchable attributes in the new or modified data packages based on causal or modeled relationships between the roles or tasks and the searchable attributes. Generating (at step 312) the one or more customized queries may include qualifying the queries with geographic restrictions based regions included in the user's role or task and/or qualifying the queries with temporal restrictions for the newly added or changed data.

Method 300 includes ranking (at step 314) the data associated with the subset of searchable attributes that match or satisfy the one or more customized queries. The ranking (at step 314) includes determining an importance or impact that the data has on the user's role or task. In some example embodiments, the ranking (at step 314) is based on the potential or possibility of sales or other opportunities in furtherance of the user's role or task. In some example embodiments, the ranking (at step 314) is based on complex relationships between the retrieved data. The relationships may reveal patterns, trends, or other insights for increasing or decreasing the likelihood of sales or for providing indicators for successful or unsuccessful advancement of other opportunities associated with the user's role or task. The complex relationships may be formed in response to different data that is associated with different searchable attributes being generated from a common event or action. For example, a sales agent may complete a sale of a product to a particular customer. The completed sale may result in a first data package being generated by the sales agent to list the particular customer's preferences, update a size of the particular customer's business, and/or record other information gained from meeting with the particular customer to complete the sale. The completed sale may also result in a second data package being generated by an order fulfillment agent to update the list of customers that purchased the product, the sales volume for the product in the past week, update inventory of raw materials used to manufacture the product, and/or update other back-end warehouse or manufacturing data. The first data package and the second data package may store the different data in association with different searchable attributes. Nevertheless, search system 100 may establish a relationship between the first data package and the second data package due to the data packages being created in response to a common event with the relationship being be used to increase the importance of impact of the otherwise disparate data. For instance, the relationship may reveal other products that may be of interest to the particular customer because of their interests, measure the sales agent effectiveness (e.g., offering too many discounts or selling with increased margins), or identify an impending inventory shortfall that may disrupt future efforts.

Method 300 includes presenting (at step 316) personalized search results based on the ranking (at step 314) of the data within the subset of searchable attributes. The personalized search results are presented (at step 316) in a user interface on the user device. In some example embodiments, the personalized search results provide a ranked or ordered hot list, set of leads, or next actions for the user to take in furtherance of their role or task.

The dynamic real-time querying and the personalized search results provide real-time insights that assist users in performing their roles or tasks. The personalized search results provide hidden data that may increase the effectiveness of the user in their role or task. The dynamic real-time querying uncovers the hidden data from new or changed searchable attributes that the user may be unaware of such that manual querying of the data sources by the user would not expose the hidden data. For instance, the personalized search results for a sales representative may include leads that are ranked or ordered based on a lead conversion probability. The lead conversion probability may be determined based on the data from new or recently changed searchable attributes. The data from the new or recently changed searchable attributes may identify a new prospect with a growing business that is a significant sale opportunity, may identify an existing customer who recently has reduced their order amount, and/or may identify an existing customer that purchases goods for a first use but is unaware or does not purchase the goods for a second use that would also be beneficial to the existing customer and increase sales rates for the sales representative.

Figure 4:
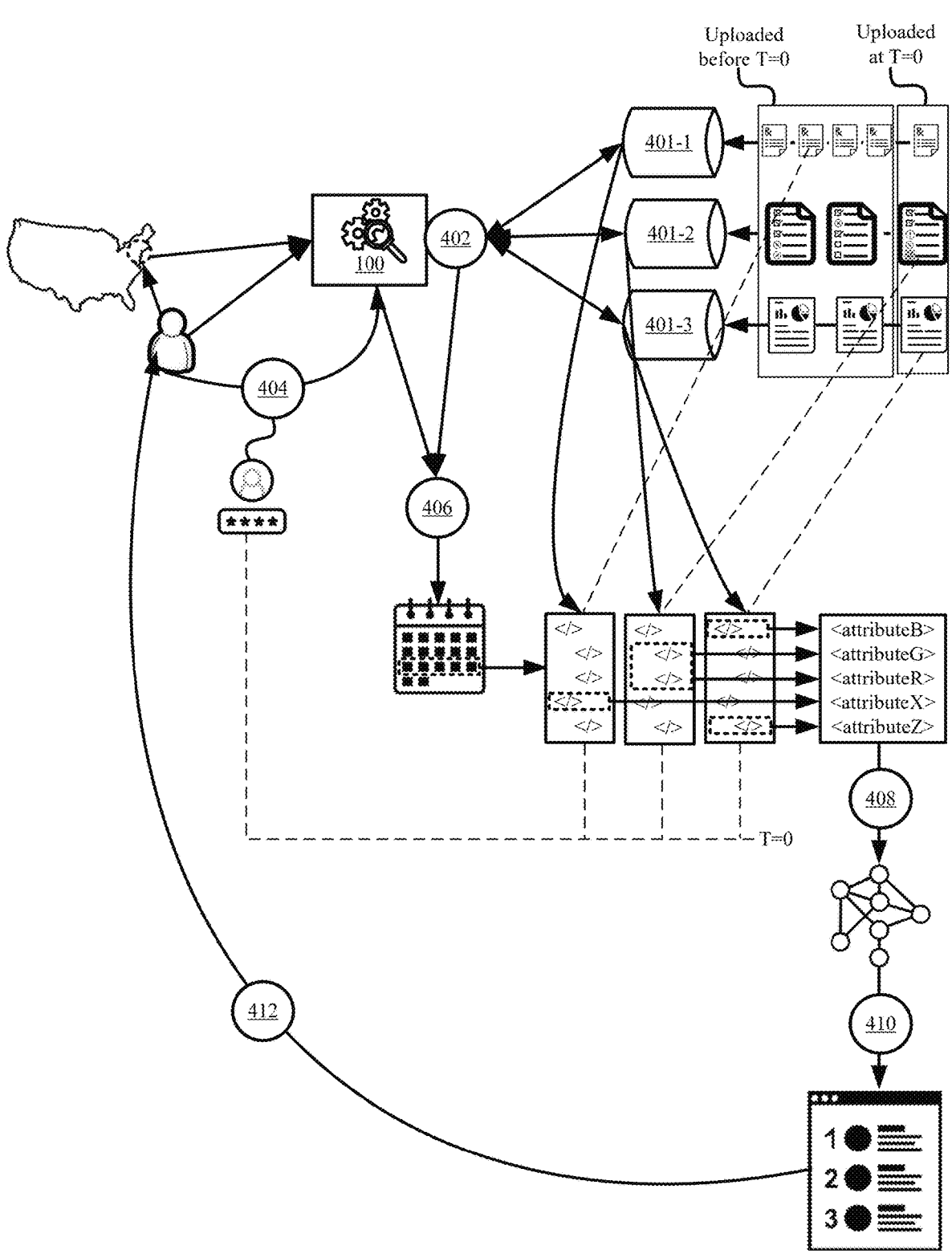
FIG. 4 illustrates an example of the personalized search results providing a user with data from hidden searchable attributes that increases the user's effectiveness in their role or task in accordance with some example embodiments presented herein.

FIG. 4 illustrates an example of the personalized search results providing a user with data from hidden searchable attributes that increases the user's effectiveness in their role or task in accordance with some example embodiments presented herein. The user is associated with a sales role that covers a particular territory or region. For instance, the user may be a pharmaceutical sales representative for a multinational company with diverse medication for myriad ailments.

Data sources 401a, 401b, and 401n (hereinafter collectively referred to as "data sources 401") receive data packages containing different types of data from different sources. For instance, first data source 401a stores data packages about prescriptions that different doctors prescribe to their patients, second data source 401b stores data packages with information about clinical trials of new and existing medications that different sales representatives may offer for sale, and third data source 401n stores CRM information that tracks previous engagements that sales representatives of the company have had with doctors in different territories and the outcomes of those engagements. The data packages may be uploaded at different times.

Search system 100 is configured with the pharmaceutical sales role or task and continuously searches (at step 402) data sources 401 for a set of searchable attributes that are relevant to that pharmaceutical sales role or task. In particular, search system 100 may select the set of searchable attributes that pertain to prescriptions written by different doctors, clinical trial information for different medications, and engagement that sales representatives have had with the doctors. The continuous searching (at step 402) may occur periodically (e.g., every day, every hour, every minute, etc.) or in response to detecting a new data package that is uploaded to any one of data sources 401.

Search system 100 detects (at step 404) a request from the user device to access search system 100. Search system 100 performs (at step 406) the dynamic real-time querying of data sources 401 by defining one or more customized queries for a subset of the set of searchable attributes related to the user's role or task in their assigned territory that have been newly added or that have changed since a last access or a last reporting period. For instance, search system 100 may generate personalized search results with data from searchable attributes that were added or changed in the last week, last month, or last quarter.

The dynamic real-time querying may expose data from searchable attributes that are hidden or otherwise unknown to the user. For instance, a data package with new or previously unseen searchable attributes may be uploaded to one of data sources 401 a minute or a second before the access request from the user device. The user would have no knowledge of the new searchable attributes and would therefore be unable to define a query to access the data from the new searchable attributes. However, the continuous searching (at step 402) and performing (at step 406) the dynamic real-time querying of the searchable attributes ensures that the data from the new previously unseen searchable attributes are included in the personalized search results. In particular, search system 100 may generate queries that target and extract data from the new searchable attributes.

Search system 100 may process (at step 408) the data in the searched subset of searchable attributes to rank or order the data in terms of importance or relevance to the pharmaceutical sales role or task. Processing (at step 408) the data may include using an LLM or other AI to detect relationships or patterns within the data and to predict or score the potential impact or contribution that the data or detected relationships or patterns have on the pharmaceutical sales role or task. For instance, a relationship between searchable attributes containing data about newly released efficacy studies or clinical trials on the effectiveness of a particular medication that is being prescribed by a doctor and that is offered by the sales representative may have high value as a potential sales opportunity for the sale representative and may be prioritized or shown earlier in the personalized search results, whereas older efficacy studies or clinical trials released over a year ago on the effectiveness of the particular medication are of less value and may deprioritized or presented lower in the personalized search results.

Similarly, a relationship between searchable attributes containing new data about a large medical office or practice with a large patient pool and low prescription rates of the offered medication is of high value as a potentially large opportunity for the sales representative and may prioritized or shown earlier in the personalized search results, whereas a relationship between searchable attributes containing recent data about a small medical office or practice with a small patient pool and already high prescription rates of the offered medication is of lower value and may be deprioritized in the personalized search results. Searchable attributes containing data about doctors outside the sales representative's territory or doctors that practice in different fields than the medications offered by the sale representative are of least value and may be excluded from the personalized search results.

Search system 100 generates (at step 410) a user interface that presents a "hot list" to the user based on personalized search results produced from processing (at step 408) the data from the subset of searchable attributes. The hot list may include a list of recommendations for medical offices or practices in the sales representative's territory that are predicted to have the highest conversion rates or best sales opportunities. For instance, the hot list may include doctors in the user's territory that the user has not recently engaged, that have a practice with a potential large pool of candidates for the user's offered medications, and that have shown a positive disposition to the medications. The hot list may rank the medical offices or practices based on preferences of the doctors associated with each medical office or practice towards the medications. The hot list may account for papers or publications by the doctors on certain ailments that the sales agent may use to customize how they engage with that doctor in order to improve a sales outcome. The hot list may reveal data from newly added searchable attributes that are unknown to the sales agent such as newly hired doctors to a practice that is expanding and therefore presents a new or larger opportunity. The hot list may rank or personalize the list of recommendations based on data from new or changing searchable attributes. For instance, a hot list that is generated for a particular sales agent at a first time may select and order the list of recommendations based on an existing medication being recently approved for a new indication or ailment, and a hot list that is generated for the particular sales agent at a second time may select and order the list of recommendations based on medical offices that more frequently prescribe a competitor's medication that has had a recent price increase. The dynamic real-time definition of the hot list based on the newly added or changed searchable attributes provides the user with active and new opportunities rather than inactive or outdated opportunities that are generated from the same set of searchable attributes.

Search system 100 presents (at step 412) the user interface on the user device prior to the user searching or initiating any query for the data. In some example embodiments, search system 100 presents (at step 412) the user interface as the first interface that the user sees after successfully logging on or accessing search system 100.

In some example embodiments, search system 100 supplements or enhances the personalized search results generated from the dynamic real-time querying by including context or supplemental data supporting the personalized search results. The personalized search results may include a listing of high-priority customers that the user is to contact and the context may specify why the customers were selected as the high-priority customers and may provide data regarding specific targeting of each customer. For instance, a first search result may identify a first doctor that prescribes a specific medication offered by the user, and the first search result context may specify that the specific medication is only being prescribed for a first indication or treatment of a first illness that the specific medication is approved for and provides information about the effectiveness of the specific medication for a second indication or treatment of a second illness that the first doctor may also prescribe the specific medication for. A second search result may identify a second doctor that has spoken negatively about the specific medication and that does not prescribe or has a very low prescription rate for the specific medication. The second search result context may link to a newly published study that describes fewer side-effects and improved effectiveness of the specific medication.

Figure 5:
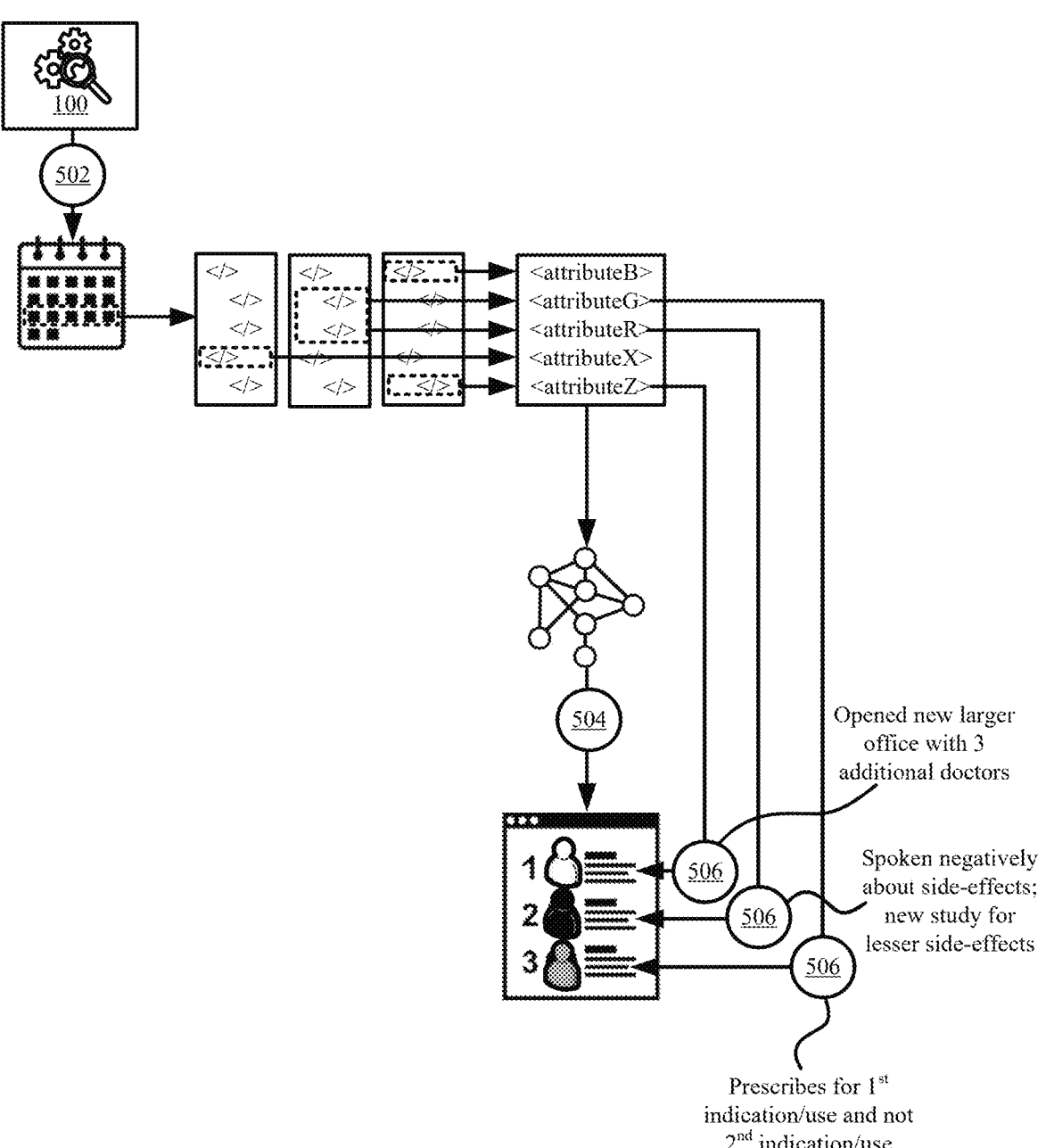
FIG. 5 illustrates an example of supplementing the personalized search results with specific context in accordance with some example embodiments presented herein.

FIG. 5 illustrates an example of supplementing the personalized search results with specific context in accordance with some example embodiments presented herein. Search system 100 generates personalized search results for a particular user with a specific role or task within an organization by automatically defining (at step 502) customized queries that extract data from new and recently changed searchable attributes having contextual and geographic relevance to the particular user or to the role or task performed by the particular user.

Search system 100 processes (at step 504) the data associated with the personalized search results to rank the data based on importance or relevance to the specific role or task. In this example, the search results that have a highest likelihood of resulting in a converted or successful sales opportunity are ranked highest.

Search system 100 supplements (at step 506) the ranked search results with the context that supports or contributes most to the ranking. For instance, the context indicates the opportunities associated with each search result. The opportunities correspond to values, text, or other data that equips the particular user with engagement information. The engagement information may provide recommendations on how the particular user is to engage or approach each customer identified in a search results and/or what information is of most relevance to the customer.

The search results may be supplemented (at step 506) with the context through various drill-down layers in the user interface. For instance, the particular user may select a personalized search result and the context may be presented in a new interface in response to the selection.

FIG. 6 illustrates example user interface 600 that presents the machine-generated personalized search results with associated context in accordance with some example embodiments presented herein. User interface 600 is generated based on the dynamic real-time querying performed by search system 100 and is presented in response to a user completing a login procedure or otherwise accessing their personalized search results without initiating a search or defining the custom queries that generated user interface 600.

User interface 600 presents a set of leads or recommendations that are dynamically curated for each user. In particular, search system 100 generates the set of leads or recommendations based on data from searchable attributes in the data packages stored across the different sources that are temporally and contextually relevant for the specific role or task performed by the user accessing user interface 600. For a sales representative that is tasked with selling or advocating cancer treatments and medications of a particular pharmaceutical provider, the set of leads or recommendations correspond to clients and potential clients that represent current or time-sensitive opportunities based on data that is discovered in real-time from new or recently changed searchable attributes.

User interface 600 may present identifying information about each client or potential client, real-time adoption statistics, and potential opportunities associated with each client or potential client. The identifying information may include the name, title, and affiliation of each lead. The real-time adoption statistics may provide real-time or updated statistics as to the lead adopting the cancer treatments or medications offered by the sales representative for different indications or uses that the cancer treatments or medications are approved for. For instance, a particular medication may be used to treat two or more different forms of cancer or the particular medication may be used to treat cancer as well as other non-cancer related illnesses. Accordingly, the real-time adoption statistics may provide the sales representatives with first context as to the different opportunities that are available for each client or potential client. Additional context may be provided by the potential opportunities. The potential opportunities may be generated based on data from certain searchable attributes that are associated with each client or potential client and may represent the actual number of converted opportunities from a total number of opportunities available with each client or potential client. For instance, the potential opportunities may estimate the number of patients or candidates that each lead has for the offered cancer treatments or medication and may present the actual number of patient or candidates that are receiving those cancer treatments or medication from the identified lead.

The user may select any of the entries within user interface 600 to expose additional context or temporally, contextually, and geographically relevant data for the selected entry. For instance, in response to selecting user interface element !601, user interface 600 may surface data from temporally, contextually, and geographically relevant searchable attributes that are determined to have impacted or contributed to the opportunities identified for the selected lead. The data may identify the entity's preference for a competitor's medication over the user offered medication, last tracked update regarding the user offered medication, usage history of the user offered medication for different approved indications or uses, and/or engagement history with the client or potential client.

The embodiments presented above are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood that the terminology used herein is for the purpose of describing concepts, and the terminology is not intended to be limiting. Unless defined otherwise, all technical and scientific terms used herein have the same meaning as commonly understood by those skilled in the art to which the embodiment pertains.

Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that the singular forms of "a," "an," and "the" include plural references unless the context clearly dictates otherwise.

Some portions of the above descriptions are presented in terms of procedures, methods, flows, logic blocks, processing, and other symbolic representations of operations performed on a computing device or a server. These descriptions are the means used by those skilled in the arts to most effectively convey the substance of their work to others skilled in the art. In the present application, a procedure, logic block, process, or the like, is conceived to be a self-consistent sequence of operations or steps or instructions leading to a desired result. The operations or steps are those utilizing physical manipulations of physical quantities. Usually, although not necessarily, these quantities take the form of electrical, optical or magnetic signals capable of being stored, transferred, combined, compared, and otherwise manipulated in a computer system or computing device or a processor. These signals are sometimes referred to as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "storing," "determining," "sending," "receiving," "generating," "creating," "fetching," "transmitting," "facilitating," "providing," "forming," "detecting," "processing," "updating," "instantiating," "identifying," "contacting," "gathering," "accessing," "utilizing," "resolving," "applying", "displaying", "requesting", "monitoring", "changing", "updating", "establishing", "initiating", or the like, refer to actions and processes of a computer system or similar electronic computing device or processor. The computer system or similar electronic computing device manipulates and transforms data represented as physical (electronic) quantities within the computer system memories, registers or other such information storage, transmission or display devices.

A "computer" is one or more physical computers, virtual computers, and/or computing devices. As an example, a computer can be one or more server computers, cloud-based computers, cloud-based cluster of computers, virtual machine instances or virtual machine computing elements such as virtual processors, storage and memory, data centers, storage devices, desktop computers, laptop computers, mobile devices, Internet of Things ("IoT") devices such as home appliances, physical devices, vehicles, and industrial equipment, computer network devices such as gateways, modems, routers, access points, switches, hubs, firewalls, and/or any other special-purpose computing devices. Any reference to "a computer" herein means one or more computers, unless expressly stated otherwise.

The "instructions" are executable instructions and comprise one or more executable files or programs that have been compiled or otherwise built based upon source code prepared in JAVA, C++, OBJECTIVE-C or any other suitable programming environment.

Communication media can embody computer-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared and other wireless media. Combinations of any of the above can also be included within the scope of computer-readable storage media.

Computer storage media can include volatile and non-volatile, removable and non-removable media implemented in any method or technology for storage of information such as computer-readable instructions, data structures, program modules, or other data. Computer storage media can include, but is not limited to, random access memory ("RAM"), read only memory ("ROM"), electrically erasable programmable ROM ("EEPROM"), flash memory, or other memory technology, compact disk ROM ("CD-ROM"), digital versatile disks ("DVDs") or other optical storage, solid state drives, hard drives, hybrid drive, or any other medium that can be used to store the desired information and that can be accessed to retrieve that information.

It is appreciated that the presented systems and methods can be implemented in a variety of architectures and configurations. For example, the systems and methods can be implemented as part of a distributed computing environment, a cloud computing environment, a client server environment, hard drive, etc. Example embodiments described herein may be discussed in the general context of computer-executable instructions residing on some form of computer-readable storage medium, such as program modules, executed by one or more computers, computing devices, or other devices. By way of example, and not limitation, computer-readable storage media may comprise computer storage media and communication media. Generally, program modules include routines, programs, objects, components, data structures, etc., that perform particular tasks or implement particular data types. The functionality of the program modules may be combined or distributed as desired in various embodiments.

The invention claimed is:

1. A computer-implemented method for dynamic real-time querying of a plurality of disparate data sources, the computer-implemented method comprising:

connecting a search system to the plurality of disparate data sources via a persistent network connection, each data source of the plurality of disparate data sources receiving continuously updated structured data packages containing a plurality of searchable attributes;

monitoring the persistent network connection to detect an upload of new or modified structured data packages to the plurality of disparate data sources in real-time;

performing a wholesale data transformation of the plurality of searchable attributes from the new or modified structured data packages into a high-performance table format;

performing a parallel searching of the high-performance table format based on different search criteria associated with different users of the search system, wherein performing the parallel searching comprises:

selecting a first set of attributes from the plurality of searchable attributes of the new or modified structured data packages with changes that have contextual and geographic relevance to the different search criteria associated with a first user; and selecting a second set of attributes from the plurality of searchable attributes of the new or modified structured data packages with changes that have contextual and geographic relevance to the different search criteria associated with a second user;

generating, without user intervention and without user-defined search parameters from the first user or the second user, a first customized query of a subset of the first set of attributes identified with said changes and a second customized query of a subset of the second set of attributes identified with said changes based on the parallel searching of the high-performance table format, wherein the search system generates the first and second customized queries for proactive searching of large volumes of changing and expanding attributes in the continuously updated structured data packages across the plurality of disparate data sources that automatically adapts search results to include subsets of changed attributes that are relevant to the different search criteria associated with the different users and that were not defined or searchable a last time the search system was accessed by the different users; and providing personalized search results of the first customized query in a first interface on a device of the first user and different personalized search results of the second customized query in a second interface on a device of the second user in response to detecting the first user and the second user accessing the search system.

2. The computer-implemented method of claim 1, wherein providing the personalized search results comprises:

receiving a first access request from the first user at a first time;

presenting data from a first subset of the first set of attributes that change during a duration prior to the first time;

receiving a second access request from the first user at a second time; and presenting data from a second subset of the first set of attributes that change during the duration prior to the second time.

3. The computer-implemented method of claim 1, further comprising:

extracting data from a first subset of the first set of attributes in response to the first subset having been added or changed while performing the parallel searching over a first time; and extracting data from a different second subset of the first set of attributes in response to the different second subset having been added or changed while performing the parallel searching over a second time.

4. The computer-implemented method of claim 1, further comprising:

receiving an access request from the device of the first user;

determining that the first user is associated with a first role or task;

modeling a relationship between the first role or task and the first set of attributes; and wherein generating the first customized query comprises:

defining the first customized query according to the relationship between the first role or task and the first set of attributes.

5. The computer-implemented method of claim 1, further comprising:

accessing a first plurality of structured data packages as each structured data package of the first plurality of structured data packages is uploaded to a first data source of the plurality of disparate data sources;

parsing each structured data package from the first plurality of structured data packages, wherein parsing each structured data package from the first plurality of structured data packages comprises adding new or modified searchable attributes in each structured data package to a tracked list of searchable attributes;

accessing a second plurality of structured data packages as each structured data package of the second plurality of structured data packages is uploaded to a second data source of the plurality of disparate data sources; and parsing each structured data package from the second plurality of structured data packages, wherein parsing each structured data package from the second plurality of structured data packages comprises adding new or modified searchable attributes in each structured data package to the tracked list of searchable attributes.

6. The computer-implemented method of claim 5, further comprising:

determining a first role or task assigned to the first user and a second role or task assigned to the second user;

selecting the first set of attributes from the tracked list of searchable attributes based on the first set of attributes affecting the first role or task; and selecting the second set of attributes from the tracked list of searchable attributes based on the second set of attributes affecting the second role or task.

7. The computer-implemented method of claim 1, further comprising:

detecting a structured data package as it is uploaded to one of the plurality of disparate data sources;

comparing searchable attributes defined in the structured data package against the plurality of searchable attributes; and modifying the plurality of searchable attributes with new or modified searchable attributes from the structured data package.

8. The computer-implemented method of claim 1, further comprising:

extracting data from the subset of the first set of attributes.

9. The computer-implemented method of claim 8, wherein providing the personalized search results comprises:

ranking the data from the subset of the first set of attributes according to an effect that the data has on a role or task performed by the first user; and sorting the data from the subset of the first set of attributes in a prioritized order based on the effect that the data has on the role or task performed by the first user.

10. The computer-implemented method of claim 1, wherein providing the personalized search results comprises:

receiving a first access request from the device of the first user at a first time;

presenting the first interface on the device of the first user at the first time in response to the first access request;

receiving a second access request from the device of the second user at a second time; and presenting the second interface on the device of the second user at the second time in response to the second access request.

11. The computer-implemented method of claim 1, wherein performing the parallel searching comprises:

selecting the first set of attributes without the first user initiating a search of the plurality of searchable attributes; and selecting the second set of attributes without the second user initiating a search of the plurality of searchable attributes.

12. The computer-implemented method of claim 1, wherein generating the first customized query and the second customized query comprises:

defining the first customized query based on the first set of attributes without input from the first user; and defining the second customized query based on the second set of attributes without input from the second user.

13. The computer-implemented method of claim 1, further comprising:

determining a first role associated with the first user in response to a first access request by a device of the first user;

invoking an application programming interface (API) based on a first API call that specifies the first role; and receiving the personalized search results of the first customized query from the API prior to responding to the first access request.

14. The computer-implemented method of claim 1, wherein performing the wholesale data transformation comprises:

converting the plurality of searchable attributes from the new or modified structured data packages into a columnar format that supports database operations.

15. The computer-implemented method of claim 1, wherein performing the parallel searching of the high-performance table format further comprises:

generating the first set of attributes for the first user and the second set of attributes for the second user in parallel based on an Online Analytical Processing (OLAP) of the high-performance table format.

16. A search system for dynamic real-time querying of a plurality of disparate data sources, the search system comprising:

one or more hardware processors configured to:

connect to the plurality of disparate data sources via a persistent network connection, each data source of the plurality of disparate data sources receiving continuously updated structured data packages containing a plurality of searchable attributes;

monitor the persistent network connection to detect an upload of new or modified structured data packages to the plurality of disparate data sources in real-time;

perform a wholesale data transformation of the plurality of searchable attributes from the new or modified structured data packages into a high-performance table format;

perform a parallel searching of the high-performance table format based on different search criteria associated with different users of the search system, wherein performing the parallel searching comprises:

selecting a first set of attributes from the plurality of searchable attributes of the new or modified structured data packages with changes that have contextual and geographic relevance to the different search criteria associated with a first user; and selecting a second set of attributes from the plurality of searchable attributes of the new or modified structured data packages with changes that have contextual and geographic relevance to the different search criteria associated with a second user;

generate, without user intervention and without user-defined search parameters from the first user or the second user, a first customized query of a subset of the first set of attributes identified with said changes and a second customized query of a subset of the second set of attributes identified with said changes based on the parallel searching of the high-performance table format, wherein the search system generates the first and second customized queries for proactive searching of large volumes of changing and expanding attributes in the continuously updated structured data packages across the plurality of disparate data sources that automatically adapts search results to include subsets of changed attributes that are relevant to the different search criteria associated with the different users and that were not defined or searchable a last time the search system was accessed by the different users; and provide personalized search results of the first customized query in a first interface on a device of the first user and different personalized search results of the second customized query in a second interface on a device of the second user in response to detecting the first user and the second user accessing the search system.

17. The search system of claim 16, wherein providing the personalized search results comprises:

receiving a first access request from the first user at a first time;

presenting data from a first subset of the first set of attributes that change during a duration prior to the first time;

receiving a second access request from the first user at a second time; and presenting data from a second subset of the first set of attributes that change during the duration prior to the second time.

18. The search system of claim 16, wherein the one or more hardware processors are further configured to:

extract data from a first subset of the first set of attributes in response to the first subset having been added or changed while performing the parallel searching over a first time; and extract data from a different second subset of the first set of attributes in response to the different second subset having been added or changed while performing the parallel searching over a second time.

19. The search system of claim 16, wherein the one or more hardware processors are further configured to:

receive an access request from the device of the first user;

determine that the first user is associated with a first role or task;

model a relationship between the first role or task and the first set of attributes; and wherein generating the first customized query comprises:

defining the first customized query according to the relationship between the first role or task and the first set of attributes.

20. A non-transitory computer-readable medium storing program instructions that, when executed by one or more hardware processors of a search system for dynamic real-time querying of a plurality of disparate data sources, cause the search system to perform operations comprising:

connecting to the plurality of disparate data sources via a persistent network connection, each data source of the plurality of disparate data sources receiving continuously updated structured data packages containing a plurality of searchable attributes;

monitoring the persistent network connection to detect an upload of new or modified structured data packages to the plurality of disparate data sources in real-time;

performing a wholesale data transformation of the plurality of searchable attributes from the new or modified structured data packages into a high-performance table format;

performing a parallel searching of the high-performance table format based on different search criteria associated with different users of the search system, wherein performing the parallel searching comprises:

selecting a first set of attributes from the plurality of searchable attributes of the new or modified structured data packages with changes that have contextual and geographic relevance to the different search criteria associated with a first user; and selecting a second set of attributes from the plurality of searchable attributes of the new or modified structured data packages with changes that have contextual and geographic relevance to the different search criteria associated with a second user;

generating, without user intervention and without user-defined search parameters from the first user or the second user, a first customized query of a subset of the first set of attributes identified with said changes and a second customized query of a subset of the second set of attributes identified with said changes based on the parallel searching of the high-performance table format, wherein the search system generates the first and second customized queries for proactive searching of large volumes of changing and expanding attributes in the continuously updated structured data packages across the plurality of disparate data sources that automatically adapts search results to include subsets of changed attributes that are relevant to the different search criteria associated with the different users and that were not defined or searchable a last time the search system was accessed by the different users; and providing personalized search results of the first customized query in a first interface on a device of the first user and different personalized search results of the second customized query in a second interface on a device of the second user in response to detecting the first user and the second user accessing the search system.

\* \* \* \* \*